Patented Dec. 6, 1949

2,490,357

UNITED STATES PATENT OFFICE 2,490,357

POLYMERIZATION OF SILOXANES

James Franklin Hyde, Corning, N. Y., assignor to Corning Glass Works, Corning, N. Y., a corporation of New York No Drawing. Application April 24, 1946,
Serial No. 664,701

10 Claims. (Cl. 260—46.5)

The present invention relates to the production of organosiloxane polymers from relatively low molecular weight completely condensed siloxanes.

The organosiloxanes, with which this invention deals, are materials which contain alternate silicon and oxygen atoms and which have organic radicals linked to the silicon atoms by carbon to silicon bonds. The organosiloxanes which are employed as the raw materials in this process are the completely condensed cyclic siloxane derivatives. Materials of this type would be desirable starting materials for the production of polymers inasmuch as they exist as well defined compounds which can be purified by crystallization, distillation and like methods. However, as these compounds are completely condensed it is obvious that they are not subject to condensation for the production of polymers.

As distinguished from the low molecular weight siloxanes which are the raw materials for the present process, and which are distinct chemical compounds, the polymeric products hereof are high molecular weight materials which are not distinct compounds. These polymeric products may be either viscous liquids or gels, which in some instances are sufficiently stiff to have the aspects of solids. These products are of substantial importance as potting compounds and as intermediates in the production of stable fluids and high temperature greases and elastomers.

An object of the present invention is to provide methods for the rearrangement of completely condensed relatively low molecular weight organosiloxanes with the production of organosiloxane polymers.

In accordance with a preferred form of this invention, a completely condensed low molecular weight organosiloxane is rearranged by contacting it with an alkali metal hydroxide in amount less than one mol of alkali metal hydroxide per 15 atoms of silicon.

The completely condensed organosiloxanes which are employed herein contain cyclic siloxane structures, i. e. they contain rings of alternating silicon and oxygen atoms. These materials preferably are of low average molecular aggregation preferably of less than 12 silicon atoms per molecule. Cyclic organosiloxanes have been described heretofore by Kipping and his co-workers. Cyclic dialkylsiloxanes and cyclic alkylarylsiloxanes are described in an article by Hyde and DeLong JACS 63, 1194 (1941). While the low molecular weight diorganosiloxane-triganosiloxane copolymers are likewise completely condensed products, the present invention does not include within its scope the treatment of such materials.

The cyclic organosiloxanes employed in accordance herewith may contain aryl radicals such as phenyl or tolyl, or alkyl radicals, such as methyl to octadecyl. The organo radicals in these siloxanes are linked to the silicon atoms by carbon to silicon bonds. At least some of the organic radicals present are alkyl radicals, and it is preferred that at least about 60% of the silicon atoms present are substituted with at least one alkyl radical containing less than five carbon atoms. When larger proportions of diaryl siloxane units are present it appears that a portion thereof may not enter into the high polymer structure, and, when the entire reaction mixture is diaryl substituted, production of a high polymer of the character here involved is not effected by the present method. This failure of the diarylsiloxane to form high polymers may be a general phenomenon, independent of the method, inasmuch as 20 mers per molecule was the highest molecular weight diarylsiloxane reported by Kipping, who worked extensively with the diarylsiloxanes for many years.

The cyclic siloxanes, in accordance herewith, are contacted with an alkali metal hydroxide. Sodium and potassium hydroxide are preferred due to the commercial availability thereof. Lithium hydroxide has been employed and, while it effects the rearrangement, it is relatively sluggish. The alkali metal hydroxide is employed in amount less than one mol per 15 atoms of silicon, and preferably in amount less than one mole per 50 atoms of silicon. It appears that the alkali metal hydroxide initially interacts with a portion of the cyclic siloxane to form a salt. In fact, the alkali metal hydroxide may be initially reacted with a corresponding diorgano silicon compound in proportion to form an alkali metal salt of the diorgano silanol and the salt be then reacted with further amounts of the siloxane in accordance herewith. The mechanism of the reaction from this point is uncertain. The reaction will proceed to the point that at least most of the cyclic material is rearranged with the formation of high molecular weight products. To a considerable extent the amount of alkali present will be controlling of the molecular weight of the product. However, after the mixture apparently comes to equilibrium a disproportionation frequently occurs with the precipitation of material relatively rich in alkali metal. Precipitation in this manner results in increasing the viscosity of the residual siloxane. Very small amounts of alkali may be employed in the present process, and it has been found that alkali in amount less than sufficient to give a silicon to alkali metal atomic ratio of 10,000/1, is effective in rearranging siloxane bonds and effecting condensation to high polymers.

The process hereof is conducted at below the temperature at which destructive distillation would occur. The temperature accordingly is maintained below about 200° C. The temperature employed may be sufficiently elevated though, that organo radicals are removed from some of the silicon atoms. This results in a decrease in the degree of substitution which is frequently desirable in the production of gels. In any event, the relative amount of dephenylation or dealkylation will not be great due to the character of the reactants.

In some instances, in order to disperse the alkali metal hydroxide more rapidly, it is desirable either to heat the reaction mixture or to add a solvent. For example, with octamethylcyclotetrasiloxane in contact with sodium hydroxide, rearrangement is slow at room temperature. However, the rearrangement becomes rapid upon either heating to around 140° C. or above or upon the addition of acetone. It appears probable that the higher rates under these conditions are the result of higher rates of dispersion rather than higher rates of reaction. The solvent may be either a polar solvent, such as water, alcohol or the like, or a non-polar solvent, such as benzene, toluene, dioxane or the like. When a solvent is employed to effect dispersion of the hydroxide, the amount added preferably is limited to not over about 15% and desirably not over 5% of the reaction mixture. Larger amounts of solvent effect dispersal but merely add to the amount to be evaporated. The presence of these small amounts of solvent limits the degree of polymerization of the product. When solvents are employed, and high viscosities are desired it is advantageous to reduce the solvent to not over 5% of the reaction mixture, and preferably eliminate the solvent before the termination of the rearrangement.

In the production of gels by the present method, improvement in the physical properties of the gels obtained from the reaction mixture may be obtained by addition to the gel of enough solvent such as alcohol or toluene to give a mixture containing 5% to 15% solvent. With the alkali still present in the gel this effects limited depolymerization of the gel. The solvent is then evaporated, whereby polymerization is again effected. The gels before and after this treatment differ in properties.

The following examples are illustrative of the process of the present invention, and should not be considered as definitive of the scope thereof.

EXAMPLE 1

A mixture of cyclic siloxanes was reacted to form a high polymer in the presence of sodium hydroxide. The siloxane mixture was obtained as follows: Dimethyldiethoxysilane was hydrolyzed with water in the presence of a small amount of hydrochloric acid, and refluxed for 8 hours with an equal volume of alcohol and a small amount of acid. The oil so produced was then washed free of acid. This oil was then heated to around 300° C. at atmospheric pressure to form and to distill off a mixture of cyclic siloxanes. The mixture so produced had a viscosity of 2.84 centistokes and contained primarily hexamethylcyclotrisiloxane and octamethylcyclotetrasiloxane.

Portions of the mixture were treated with solid powdered sodium hydroxide in calculated amounts as shown below. The mixtures were stirred until the sodium hydroxide dissolved and were then heated to and held at approximately 130°–150° C. until they appeared to reach a constant viscosity and no more water was evolved. The alkali was then removed by one of two procedures. In one procedure the samples were diluted with benzene, poured into a separatory funnel having sufficient dilute hydrochloric acid to completely neutralize the alkali and then washed. After several washings they were neutralized with 1–2 drops of aqueous NH$_3$ and washed to neutrality. Solvent and moisture were then removed by warming in vacuum. In the other procedure, toluene saturated with HCl gas was added to the alkali treated samples until they were slightly acid. They were then treated with NH$_3$ until faintly alkaline. The precipitated salts were allowed to settle and the solution decanted. The solvent was removed by heating. The latter procedure is preferred over the first because emulsions which tend to form particularly in the case of the very viscous polymers are avoided. The following table gives the several different amounts of NaOH, the latter being given in terms of ratio of silicon atoms in the original dimethyl siloxane to the sodium atoms in the alkali initially added.

*Table 1*

| Ratio of Si Atoms to Na Atoms | Final Viscosity in Centistokes, cs. |
|---|---|
| 15 | 49.4 |
| 30 | 86.99 |
| 60 | 208.0 |
| 90 | 2,825.0 |
| 125 | 19,000 |
| 500 | Gel |

Besides sodium hydroxide, lithium hydroxide, potassium hydroxide, and rhubidium hydroxide have been employed for the production of high polymers from this mixture of cyclic siloxanes.

EXAMPLE 2

A mixture of 21.30 parts by weight of hexamethylcyclotrisiloxane and 0.2302 part of powdered sodium hydroxide was heated at 77° C. in a reactor protected against entry of carbon dioxide. After 20 minutes the siloxane had melted and stirring was started. The temperature was maintained at 75° to 78° C. The course of the reaction was followed by determining the viscosity of the reaction product at 25° C. in 10% toluene solution. The viscosity increased with time as shown below:

| Time in hours | Viscosity in Cs. |
|---|---|
| 2.5 | 0.96 |
| 9.0 | 2.1 |
| 23.5 | 13.3 |
| 72.0 | 28.6 |
| 122.5 | 29.6 |
| 166.5 | 33.9 |
| 319.2 | 60.8 |

During the reaction, the atomic ratio of silicon to sodium was 50/1.

EXAMPLE 3

By the method described in Example 2, 14.60 parts by weight of hexamethylcyclotrisiloxane were reacted in the presence of 0.0393 part of powdered sodium hydroxide. The course of the reaction was as follows:

| Time in hours | Viscosity in Cs. of 10% toluene solution |
|---|---|
| 3.3 | 0.92 |
| 25.7 | 12.8 |
| 117.4 | 56.4 |
| 121.9 | 62.7 |
| 164.4 | 60.4 |

The polymer so produced was dissolved in 176 parts of benzene. The solution was washed three times with 5% acetic acid, employing 50 parts for each wash, and then to neutrality with water. Solvent and low boiling siloxanes were removed by reducing the pressure to 15 mm., and by then heating at 150° C. for an hour at a pressure of a few microns. The viscosity of a 10% solution in toluene at 25° C. was then 62.81 cs.

During the reaction the atomic ratio of silicon to sodium was 200/1.

EXAMPLE 4

Hexamethylcyclotrisiloxane was treated with concentrated aqueous sodium hydroxide solution at 70° C. with stirring. The sodium hydroxide was added in amount to give an atomic ratio of silicon to sodium of approximately 800/1. After 118 hours, it was extremely viscous and hard to stir. The polymerization had advanced beyond the tacky stage. At this point, 0.12 to 0.24 part by weight of benzene was added per part of reaction product, and stirring was continued for an additional 24 hours at 60° to 70° C. This polymer in benzene solution was washed neutral, following which the benzene was taken off under vacuum. The product was a semi-solid with very little more flow at 250° C. than at room temperature. After heating for six hours at 250° C. it is insoluble in toluene. A 50% solution in toluene has a viscosity in the range between 60,000 and 100,000 centistokes. The intrinsic viscosity of the polymer is 8.

EXAMPLE 5

A mixture was prepared of 5.73 parts by weight of hexamethylcyclotrisiloxane and 0.0586 part of potassium hydroxide. The mixture was heated to 77° C. and stirred. After about 15 minutes, during which rapid reaction occurred, another 26.9 parts of the siloxane were added. The mixture again became very viscous. In another 20 minutes an additional 29.5 parts of the siloxane were added. Again the viscosity increased rapidly. The atomic ratios of silicon to potassium were 74, 420, and 803 respectively.

EXAMPLE 6

The sodium salt of tetramethyldisiloxanedial-1, 3 $Na_2O.(Me_2SiO)_2$ is one of the salts which is formed by interaction of sodium hydroxide and the cyclic dimethylsiloxanes. A portion of this salt, which contained 0.2 mol of water per atom of sodium, was added to hexamethylcyclotrisiloxane in amounts to give an atomic ratio of silicon to sodium of 264. The reaction mixture was maintained at 77° C. with stirring. The course of the reaction was followed by determining the viscosity at 25° C. of 20% solutions of the polymer in toluene, and is shown below.

| Time in hours | Viscosity in centistokes |
|---|---|
| 20 | 30 |
| 50 | 130 |
| 65 | 530 |
| 310 | 980 |

EXAMPLE 7

A mixture was prepared of octamethylcyclotetrasiloxane, enough flake sodium hydroxide to give an atomic ratio of silicon to sodium of 100/1 and one mol of isopropanol, containing 15% of $H_2O$, per mol of sodium hydroxide. The mixture was heated to 60° C. to 70° C. and stirred. The course of the reaction was followed by measurement of the viscosity in centistokes, and was as follows:

| Time in hours | Viscosity in centistokes |
|---|---|
| 0 | 2.28 |
| 169 | 270 |
| 399 | 2,952 |
| 556 | 5,368 |
| 643 | 6,600 |
| 866 | 14,950 |
| 953 | 48,045 |

EXAMPLE 8

High polymers were prepared from octamethylcyclotetrasiloxane in the presence of sodium hydroxide in amount to give an atomic ratio of 100/1 silicon to sodium and in the presence of 10 mols of alcohol per mol of sodium hydroxide. In one instance a dried methanol and in the other dried isopropanol was employed. The reactions proceeded as follows:

| Time in hours | Viscosity in centistokes | |
|---|---|---|
| | With Methanol | With Isopropanol |
| 0 | 2.28 | 2.28 |
| 20 | 541 | 97.2 |
| 87 | 986 | 1,173 |
| 284 | [1] 6.5 | 13,940 |
| 328 | [1] 7.4 | 22,050 |
| 397 | [1] 8.0 | 34,230 |

[1] Viscosity determined in 10% toluene solution.

EXAMPLE 9

Octomethylcyclotetrasiloxane was reacted in the presence of sodium hydroxide, the atomic ratio of silicon to sodium being 100/1 and in the presence of acetone, methanol, and isopropanol in amount to give a mol. ratio of solvent to sodium hydroxide of 50/1. The courses of the reactions were as follows:

| Time in hours | Viscosity in centistokes | | |
|---|---|---|---|
| | With Acetone | With Methanol | Isopropanol |
| 92 | 1360 | | |
| 118 | | 216 | 54.7 |

EXAMPLE 10

Dodecamethylcyclohexasiloxane was treated with powdered sodium hydroxide in amount to give a silicon to sodium atomic ratio of 100 to 1, at 77° C. After three hours the viscosity was 6.84 which increased to 1324 centistokes after 22 hours.

EXAMPLE 11

Symmetrical triphenyltriethylcyclotrisiloxane was treated with sodium hydroxide at an atomic ratio of 100 silicon per sodium. After 24 hours stirring at 60° C., the viscosity was 10,920 cs., and after 96 hours it was in the range of 500,000 to 1,000,000 cs.

EXAMPLE 12

Methylphenyldiethoxysilane was hydrolyzed by dropping slowly into aciduated water. The acidity was neutralized with ammonia. Water and benezene were added and the material washed free from excess ammonia. The product was warmed to remove water and solvent, and subjected to high vacuum till of constant weight. This product had a viscosity corresponding to that of completely condensed cyclics. The product so prepared was divided into two portions and treated with sodium hydroxide in quantity to give atomic ratios of silicon to sodium of 50/1 and 100/1. A small amount of water and alcohol was added to each to disperse the alkali. They were warmed for one hour and then the water and alcohol were taken off under a high vacuum. They were then heated at 225° C. under high vacuum for one hour. The viscosities of the two were 1,111 and 643 centistokes respectively.

EXAMPLE 13

Hexaethylcyclotrisiloxane was mixed separately with sodium hydroxide and with potassium hydroxide at atomic ratios of silicon to alkali metal of 200/1 and 158/1 respectively. The two were held at about 100° C. In the case of the sodium hydroxide, the viscosity had increased to 29.9 centistokes after 93 hours. In the case of potassium hydroxide, after about 75 hours, the viscosity was too high to determine undiluted, so it was dissolved in ether, neutralized with acetic acid, washed to neutrality and the solvent removed. The intrinsic viscosity in toluene was then found to be 3.

This present application is in part a continuation of my copending application Serial No. 481,154, filed March 30, 1943, now abandoned.

I claim:

1. The method of preparing diorganosiloxane polymers which comprises contacting cyclic diorganosiloxanes in which all of the organic radicals are selected from the group consisting of alkyl and monocyclicaryl radicals, at least some of the organic radicals being alkyl, with an alkali metal hydroxide in amount from 1 alkali metal atom per 10,000 silicon atoms to 1 alkali metal atom per 15 silicon atoms, at a temperature below that at which the destructive distillation would occur and until an increase in the molecular aggregation is effected.

2. The method which comprises contacting a cyclic diorgano siloxane in which all of the organic radicals are selected from the group consisting of alkyl and monocyclicaryl radicals, at least some of the organic radicals being alkyl, with an alkali metal hydroxide in amount from 1 alkali metal atom per 10,000 silicon atoms to 1 alkali metal atom per 15 silicon atoms, in the presence of a solvent whereby to effect dispersion of the alkali metal hydroxide in the siloxane, and substantially eliminating the solvent from the system at a temperature below that at which destructive distillation occurs and until an organopolysiloxane of increased molecular aggregation is produced.

3. The method of preparing diorganosiloxane polymers which comprises mixing an alkali metal hydroxide, a cyclic diorganosiloxane in which all of the organic radicals are selected from the group consisting of alkyl and monocyclicaryl radicals and in which at least some of the organic substituents are alkyl radicals, and a solvent, the alkali metal hydroxide being present in amount of from 1 alkali metal atom per 10,000 silicon atoms to 1 alkali metal atom per 15 silicon atoms, and the solvent being employed in amount less than 5 percent of the siloxane present, maintaining the reaction mixture obtained thereby at a temperature below the temperature at which destructive distillation occurs and until a polymer of higher molecular weight than the starting polymer is obtained.

4. The method which comprises mixing a cyclic diorganosiloxane in which all of the organic radicals are selected from the group consisting of alkyl and monocyclicaryl radicals, at least some of the organic radials being alkyl radicals, said cyclic siloxanes having an average molecular aggregation of less than 12 silicon atoms per molecule, with an alkali metal hydroxide in amount from 1 alkali metal atom per 10,000 silicon atoms to 1 alkali metal atom per 15 silicon atoms and maintaining the resultant reaction mixture at a temperture below the temperature at which destructive distillation would occur and until the viscosity of the reaction mixture has increased, whereby an organosilicon polymer of increased molecular weight is produced.

5. The method which comprises mixing a cyclic diorganosiloxane which has an average molecular aggregation of less than 12 silicon atoms per molecule, all of the organic substituents of said siloxane being selected from the group consisting of alkyl and monocyclicaryl radicals, and at least 60 per cent of the silicon atoms being substituted with at least one alkyl radical containing less than 5 carbon atoms, with an alkali metal hydroxide in amount of 1 alkali atom per 10,000 silicon atoms to 1 alkali metal atom per 15 silicon atoms, and maintaining the resultant reaction mixture at a temperature below the temperature at which destructive distillation would occur and until the viscosity of the reaction mixture has increased whereby diorganosiliconpolysiloxanes are produced.

6. The method of preparing dimethylsiloxane polymers which comprises contacting a cyclic dimethyl polysiloxane with an alkali metal hydroxide in amount from 1 alkali metal atom per 10,000 silicon atoms to 1 alkali metal atom per 15 silicon atoms at a temperature below that at which destructive distillation would occur and until a gel is produced.

7. The method of preparing dimethylsiloxane polymers which comprises contacting a cyclic dimethylpolysiloxane which has an average molecular aggregation of less than 12 silicon atoms per molecule with an alkali metal hydroxide in amount from 1 alkali metal atom per 10,000 silicon atoms to 1 alkali metal atom per 15 silicon atoms at a temperature below that at which destructive distillation would occur, and until a gel is produced.

8. The method which comprises reacting cyclic diorgano siloxane in which the organic radicals are selected from the group consisting of alkyl and monocyclicaryl radicals and in which at least some of the organic substituents are alkyl radicals with an alkali metal salt of a diorganosiloxane in which the organic radicals are selected from the group consisting of alkyl and monocyclicaryl radicals, said salt being present in amount sufficient that the atomic ratio of alkali metal atoms to silicon atoms is from 1 to 10,000 up to 1 to 15, and maintaining the reaction mixture at a temperature below the temperature at which destructive distillation would occur until the viscosity of the reaction mixture has increased whereby organosilicon polymers are produced.

9. The method in accordance with claim 8 in which at least 60 per cent of the silicon atoms present are substituted with at least 1 alkyl radical containing less than 5 carbon atoms per radical.

10. The method in accordance with claim 1 in which said temperature is maintained below 200° C.

JAMES FRANKLIN HYDE.

REFERENCES CITED

The following references are of record in the file of this patent:

UNITED STATES PATENTS

| Number | Name | Date |
|---|---|---|
| 2,371,068 | Rochow | Mar. 6, 1945 |

OTHER REFERENCES

Robison et al.: J. Chem. Soc., vol. 93, 1908, pp. 439–445.

Robison et al.: J. Chem. Soc., vol. 101, 1912, pp. 2156, 2159, 2161.

Kipping et al.: J. Chem. Soc., vol. 105, 1914, pp. 484, 496.

Chem. & Eng. News, vol. 24, May 10, 1946, pp. 1233 and 1234.